United States Patent [19]

Rosenstock et al.

[11] 4,261,748
[45] Apr. 14, 1981

[54] INK FOR A RECORDING DEVICE

[75] Inventors: Guenter Rosenstock; Gerhard Wagner, both of Munich, Fed. Rep. of Germany

[73] Assignee: Siemens Aktiengesellschaft, Berlin & Munich, Fed. Rep. of Germany

[21] Appl. No.: 969,109

[22] Filed: Dec. 13, 1978

[30] Foreign Application Priority Data

Dec. 14, 1977 [DE] Fed. Rep. of Germany ....... 2755773

[51] Int. Cl.³ .......................................... C09D 11/02
[52] U.S. Cl. ................................................... 106/22
[58] Field of Search ......................................... 106/22

[56] References Cited

U.S. PATENT DOCUMENTS

| | | | |
|---|---|---|---|
| 3,519,443 | 7/1970 | Kaplan et al. | 106/22 |
| 4,070,322 | 1/1978 | Hwang et al. | 260/29.6 R |
| 4,073,615 | 2/1978 | LaCroix et al. | 8/25 |
| 4,106,027 | 8/1978 | Hoffman et al. | 346/1 |
| 4,150,997 | 4/1979 | Hayes | 106/15.05 |

FOREIGN PATENT DOCUMENTS

| | | |
|---|---|---|
| 1249232 | 10/1971 | United Kingdom . |
| 1265590 | 3/1972 | United Kingdom . |
| 1304656 | 1/1973 | United Kingdom . |
| 1347262 | 2/1974 | United Kingdom . |
| 1379756 | 1/1975 | United Kingdom . |
| 1470655 | 4/1977 | United Kingdom . |

*Primary Examiner*—Earl A. Nielsen
*Attorney, Agent, or Firm*—Hill, Van Santen, Steadman, Chiara & Simpson

[57] ABSTRACT

An ink for a recording device, particularly for an ink recording device in which the ink is given off by means of pressure in a direction towards the recording carrier by a recorder head, which is spaced from the record member, and in which a vacuum is formed in the ejecting chamber.

15 Claims, No Drawings

INK FOR A RECORDING DEVICE

BACKGROUND OF THE INVENTION

This invention lies in the field of inks for recording devices wherein ink is ejected from a recording head towards a record member.

Techniques are known for recording information on recording carriers (or record members) by means of a controlled spraying of an ink liquid wherein the recording head is in spaced relationship to the recording carrier (or record member). In such a technique, the ink liquid is ejected droplet by droplet under pressure from one or more nozzles in a direction towards the record member. The art appreciates how to convey the ink liquid to the recorder head under low or high pressure, as desired, and also how to apply the ink liquid from a recorder head being maintained under a slight vacuum. The ink is ejected from a recorder head by means of an electrostatic field, or, by means of space alterations in the ink ejection chamber of the recorder head. The ink of the present invention, for example, can be utilized in an apparatus such as is provided in the German Offenlegungsschrift No. 2,543,451 (corresponding to U.S. application Ser. No. 727,038 filed Sept. 27, 1976) now abandoned.

A source of problems in the utilization of such ink-using recording devices is the prior art inks utilized. The ink used should form a nonfading deposit on the record member which is as rich in contrast as possible relative to record member background areas, yet the ink should not plug the record head nozzles even after long periods of apparatus disuse.

A number of inks are known for liquid recording wherein it is desired to have an ink viscosity below 10 centipoises, or even under 5 centipoises, at a surface tension of 40 through 50 dynes per centimeter. Great importance was allotted to the creation of inks having a viscosity below 10 centipoises. Moreover, apparatus also became known pointing to the need therefor, such as would enable, for example, the recording onto smooth surfaces and indeed thereby achieve a recorded surface etched with an aggressive ink component.

BRIEF SUMMARY OF THE INVENTION

More particularly, the present invention relates to ink compositions. Such compositions are useful in recording devices, particularly recording devices wherein the ink is ejected under pressure towards a record member from a recording head located in spaced relationship to the record member. The ejection chamber of the recording head has subatmospheric pressures maintainable therein. In such ink compositions of this invention, a dyestuff which is acidic is utilized in combination with a solubilizing agent which is alkaline in effect. Both such dyestuff and such solubilizing agent are dissolved in a solvent system having a large dipole moment and having a hygroscopic behavior which compensates for solvent evaporation.

It is a primary object of the present invention to provide an ink suitable for the recording of information onto normal writing paper and in which a plugging of the recording nozzles is substantially completely eliminated with highest possible reliability. A plugging of recording nozzles interrupts the recording process. In directly operated recording machines, a removal of any plugging of nozzles can be accomplished by operating personnel. However, even in such machines such an interference is very inconvenient, while in recording devices which are not continuously monitored, and which are not operated by operating personnel directly, such as, for example, in data or teletype machines, no allowances can be made for breakdowns of the recording device caused by a plugging of pringing nozzles. Monitoring the functioning efficiency at this point is extremely difficult, although possible. Because at least those teletype machines connected to a public teletype network always have to be ready for immediate operation, and because typically such machines are also in a non-monitored condition, the breakdown potential probability of the recorder heads therein must be reduced to a minimum.

In accordance with the present invention, an ink is provided, which, has improved non-plugging characteristics even with different normal surrounding influences, yet does not compromise the functioning efficiency of a recorder head. At the same time, such ink is capable of producing a stable recorded image which is rich in contrast on conventional record members.

Other and further aims, objects, purposes, advantages, uses, and the like for the present invention will be apparent to those skilled in the art from the present specification.

DETAILED DESCRIPTION

In ink compositions of this invention, the dyestuff acid and the alkaline acting dissolving (solubilizing) agent are both dissolved in a solvent system. The interrelationship between these materials is such that the dissolving agent at least compensates for the acidic effect of the dyestuff acid and thus dissociates the dyestuff acid in the solvent medium. The solvent medium is characterized by having a large dipole moment and by having a hygroscopic behavior compensating evaporation. The dyestuff acid employed in the ink composition is capable of supplying a stable recorded image which is rich in contrast on a conventional or normal record member. The combination of components in an ink composition is such that a plugging of recorder head nozzles, and also of any filters utilized, is substantially completely prevented with the greatest safety possible. By employing a solvent composition having a high dipole moment, a dissolution of the dyestuff acid in the solvent composition is achieved with greatest possible safety thereby minimizing the possibility of dyestuff particles being present which can lead to a nozzle plugging. By having a solvent composition with hygroscopic behavior as indicated, the evaporation loss inherently associated with a solvent system is compensated for so that a desired viscosity for an ink composition of this invention is maintained.

In accordance with a preferred embodiment of the present invention, an ink composition exhibits a viscosity of from about 15 to 100 centipoises (measured at a surface tension of about 40 to 50 dynes per centimeter at ambient pressures and temperatures.) A viscosity of about 20 centipoises, so measured, is particularly advantageous. Ink compositions of this invention with such viscosity values are particularly effective for use in recording devices wherein the ink is ejected from the recorder head by altering the space volume in the recorder head, as in such apparatus the droplet frequency of the ejected ink stream from the nozzle (or nozzles as the case may be) can be advantageously regulated by means of the inherent dampening action associated with such an ink composition of this invention.

In ink compositions of the invention, it is additionally desirable to employ a solvent system wherein the individual components of the solvent system have respective viscosities whose values lie close to the viscosity associated with a solvent system composition. By altering the individual solvent components, for example, by evaporation, or by temperature fluctuations, or similar influences, the ink composition viscosity desired is thus not substantially altered.

Various combinations of solvents can be employed. To obtain the desired combination of properties, one can employ a mixture of water and diethylene glycol. A more preferred solvent composition comprises diethylene glycol and dimethylsulfoxide. Like water, dimethylsulfoxide has a high dipole moment and is thus a good solvent agent for use in the present invention. Moreover, dimethylsulfoxide is hygroscopic and has a low evaporation rate. Also, it penetrates paper particularly rapidly, which is desirable from the standpoint of the present invention since many records members involve paper. Also, like water, dimethylsulfoxide approximately corresponds in viscosity to water and is miscible in all proportions with diethylene glycol.

The viscosity of a solvent composition comprised of diethylene glycol and dimethylsulfoxide is still so low at $-20°$ C. that an ink composition of this invention using such a solvent composition can still be used for a recording operation. Even at temperatures of $-70°$ C. such a solvent composition is not yet frozen but rather remains only viscous so that indeed while no recording operation is possible, as when such a solvent system is used in an ink composition of the present invention, nevertheless, no destruction of the recorder head need be feared. Such two solvents, diethylene glycol and dimethylsulfoxide, have relatively closely adjacent viscosity values, over the broad scale of possible viscosities, with the viscosity of dimethylsulfoxide being about two centipoises while the viscosity of diethylene glycol is about 38 centipoises, measured as above indicated. Furthermore, a composition of diethylene glycol and dimethylsulfoxide has an advantageous evaporation factor yet is also hygroscopic so that evaporation losses are compensated for during use of an ink composition of this invention in recording apparatus of the class indicated above.

Furthermore, the solvent compounds dimethylsulfoxide and diethylene glycol have in combination with one another a low solubility for gases, particularly air, and have a very low vapor pressure, as is desirable in the preferred practice of the present invention. Thus, a gas accumulation in an ink composition for use in recording devices of the class above indicated is detrimental to the operation thereof because gas tends to cause a cavitation effect within the recorder head when the interior volume thereof is increased during routine operation of the apparatus.

A preferred dissolving agent for use in the practice of the present invention is sodium carbonate. An alternative but also preferred dissolving agent is triethanolamine. Both of these agents have an alkaline effect whereby the dyestuff acid concentration in a solvent medium can be quantitatively regulated, as desired.

In general, an ink of this invention as characterized above typically comprises on a 100 weight percent total ink basis:

(A) From about 2.5 to 12 weight percent of a dyestuff acid, as characterized above,
(B) From about 1 to 20 weight percent of a dissolving agent such as characterized above, and
(C) From about 70 to 95 weight percent of such a solvent medium as characterized above.

Such a solvent medium has a dipole moment preferably of at least about 3.5 and an evaporation rate $>1500$.

Preferably a solvent medium comprises on a 100 weight percent total solvent medium basis:

(A) From about 25 to 40 weight percent of diethylene glycol, and
(B) From about 40 to 70 weight percent of dimethylsulfoxide.

For purposes of this invention, viscosity is measured about 20 [CP].

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE I

Dimethylsulfoxide is mixed with diethylene glycol to produce a solvent medium comprised of about 33.3 weight percent dimethylsulfoxide and 66.6 weight percent diethylene glycol on a 100 weight percent total solvent medium basis. This solvent medium has a dipole moment of about 3.5 Debye and an evaporation rate $>1500$.

Then, first about 1.2 weight percent of sodium carbonate, and thereafter about 2.8 weight percent dyestuff acid are dissolved in this solvent medium on a 100 weight percent total product composition basis. The dyestuff acid consists of A70-compounds. The product composition has a viscosity of about 20 centipoises.

EXAMPLE II

A solvent medium comprised of about 30 weight percent (3 volumes) diethylene glycol and about 50 weight percent (5 volumes) dimethylsulfoxide, on a 100 percent total solvent composition basis, is prepared by admixing one compound with the other. The resulting solvent medium has a dipole moment of about 3.5 Debye and an evaporation rate $>1500$.

Then, first about 10 weight percent of triethanolamine, and thereafter about 10 weight percent of dyestuff acid are dissolved in such solvent medium on a 100 weight percent total product composition basis. The dyestuff acid consists of A70-compounds. The product composition has a viscosity of about 20 centipoises.

The claims are:

1. Ink for a recording device of the type where ink is discharged toward a record member from a recorder head which is located in spaced relationship to the record member, said ink being characterized by having an acid dye and a dissolving agent having an alkaline effect of increasing the pH of a solution of said acid dye in said solvent medium, said solvent medium having a great dipole moment, and also having a hygroscopic behavior compensating for evaporation said ink having viscosity of from about 15 to 100 centipoises at ambient temperature and pressure.

2. The ink of claim 1, wherein said ink has a viscosity of about 20 centipoises.

3. The ink of claim 1, wherein the individual respective components comprising said solvent medium each exhibit a viscosity which is close to the viscosity of said solution medium.

4. The ink of claim 1, wherein said solvent medium is comprised of diethylene glycol and dimethylsulfoxide.

5. The ink of claim 1, wherein said dissolving agent is sodium carbonate.

6. The ink of claim 1, wherein said dissolving agent is triethanolamine.

7. The ink of claim 1, wherein said ink comprises on a 100 weight percent total ink basis:
   (A) From about 2.8 to 10 weight percent of said dyestuff acid,
   (B) From about 1.2 to 10 weight percent of said dissolving agent, and
   (C) From about 80 to 97 weight percent of said solvent medium.

8. The ink of claim 7, wherein said solvent medium has a dipole moment of at least about 3.5 Debye and an evaporation rate >1500.

9. The ink of claim 8, wherein said solvent medium comprises on a 100 weight percent total solvent medium basis:
   (A) From about 25 to 40 weight percent of diethylene glycol, and
   (B) From about 40 to 70 weight percent of at least one compound selected from the group consisting of water and dimethylsulfoxide.

10. The ink of claim 9, wherein said compound is water.

11. The ink of claim 9, wherein said compound is dimethylsulfoxide.

12. The ink of claim 8, wherein said dissolving agent is selected from the group consisting of sodium carbonate and triethanolamine.

13. The ink of claim 12, wherein said dissolving agent is sodium carbonate.

14. The ink of claim 12, wherein said dissolving agent is triethanolamine.

15. An ink for a recording device of the type where ink is discharged toward a record member from a recorder head located in spaced relationship to the said record member said ink having a viscosity of from about 15 to 100 centipoises at ambient temperature pressure, said ink comprising on a 100 weight percent total ink basis:
   (A) from about 2.8 to 10 weight percent of an acid dye,
   (B) from about 1.2 to 10 weight percent of a dissolving agent selected from the group consisting of sodium carbonate and triethanolamine, and
   (C) from about 80 to 97 weight percent of a solvent medium,
said solvent medium comprising on a 100 weight percent total solvent medium basis:
   (A) from about 25 to 40 weight percent diethylene glycol, and
   (B) from about 50 to 70 weight dimethylsulfoxide.

* * * * *